(12) United States Patent
Ishii

(10) Patent No.: US 8,596,683 B2
(45) Date of Patent: Dec. 3, 2013

(54) STEERING APPARATUS

(75) Inventor: Toru Ishii, Gunma-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/520,575

(22) PCT Filed: Apr. 4, 2012

(86) PCT No.: PCT/JP2012/059957
§ 371 (c)(1),
(2), (4) Date: Jul. 4, 2012

(87) PCT Pub. No.: WO2012/141233
PCT Pub. Date: Oct. 18, 2012

(65) Prior Publication Data
US 2013/0014606 A1    Jan. 17, 2013

(30) Foreign Application Priority Data
Apr. 14, 2011 (JP) ................. 2011-089784

(51) Int. Cl.
*B62D 1/18* (2006.01)
(52) U.S. Cl.
USPC ............................. 280/775; 280/777; 280/779
(58) Field of Classification Search
USPC .......................................... 280/775, 777, 779
See application file for complete search history.

(56) References Cited

U.S. PATENT DOCUMENTS

| | | | | |
|---|---|---|---|---|
| 7,344,157 B2 * | 3/2008 | Jensen et al. | ................. | 280/777 |
| 7,393,014 B2 * | 7/2008 | Bechtel et al. | ................. | 280/777 |
| 7,665,767 B2 * | 2/2010 | Olgren et al. | ................. | 280/777 |
| 7,669,500 B2 * | 3/2010 | Matsui et al. | ................. | 74/493 |
| 8,033,574 B2 * | 10/2011 | Menjak et al. | ................. | 280/777 |
| 8,408,089 B2 * | 4/2013 | Oshita et al. | ................. | 74/492 |
| 2002/0036404 A1 * | 3/2002 | Li et al. | ................. | 280/777 |
| 2007/0013182 A1 * | 1/2007 | Bechtel et al. | ................. | 280/777 |
| 2008/0111363 A1 * | 5/2008 | Menjak et al. | ................. | 280/777 |
| 2009/0218801 A1 * | 9/2009 | Park | ................. | 280/777 |
| 2010/0032933 A1 * | 2/2010 | Cymbal et al. | ................. | 280/777 |
| 2012/0169035 A1 * | 7/2012 | Minamigata et al. | ................. | 280/777 |
| 2012/0193902 A1 * | 8/2012 | Akutsu et al. | ................. | 280/777 |

FOREIGN PATENT DOCUMENTS

| | | | |
|---|---|---|---|
| JP | 2005-219641 A | 8/2005 |
| JP | 2007-038822 A | 2/2007 |
| JP | 2007-504985 A | 3/2007 |
| JP | 2008-114837 A | 5/2008 |
| JP | 2008-302752 A | 12/2008 |

* cited by examiner

*Primary Examiner* — Toan To
(74) *Attorney, Agent, or Firm* — Miles & Stockbridge P.C.

(57) ABSTRACT

In a steering apparatus including a column 46, a column 42, a bracket 21 movable with respect to the column 42 upon a secondary collision, a member 81 attaching to the moving bracket 21 and absorbing impact energy with making plastic deformation, a guide bracket 61 fixed to the column 46 and having a guide groove 63 guiding movement of the column 42, and a guide pin 71 fixed to the bracket 21 and movable with the bracket 21 with being guided by the guide groove 63, the guide bracket 61 includes a gap forming portion 61e forming a gap 61d between the guide bracket 61 and the bracket 21, a member 81 is latched to the guide bracket 61 and includes an extending portion extending along the gap 61d, thereby providing a steering apparatus not necessary to fix an end of an impact-energy-absorption member to a vehicle-body-side bracket upon attaching the steering apparatus to the vehicle body, or not restricting a shape of a connecting member by the impact-energy-absorption member.

15 Claims, 14 Drawing Sheets

STEERING APPARATUS

TECHNICAL FIELD

The present invention relates to a steering apparatus, in particular to a steering apparatus in which the steering wheel is adapted to make a collapsing movement or move forward with respect to the vehicle body to absorb the impact load upon a secondary collision.

BACKGROUND ART

Japanese Patent Application Laid-Open Nos. 2007-38822 and 2005-219641 disclose a steering apparatus in which the steering wheel is adapted to make a collapsing movement or move forward with respect to the vehicle body by means of plastic deformation of a metal wire, which is an impact-energy-absorption member, to absorb the impact load upon a secondary collision. Japanese Patent Application Laid-Open No. 2007-38822 discloses a steering apparatus in which an end of a wire is fixed to a vehicle-body-side bracket, which is fixed to the vehicle body, and the wire is made plastic deformation caused by movement of a vehicle-mounting bracket detached from the vehicle-body-side bracket frontward with respect to the vehicle body upon a secondary collision, thereby absorbing an impact load.

PRIOR ART DOCUMENT

Patent Document

Patent Document 1: Japanese Patent Application Laid-Open No. 2007-38822
Patent Document 2: Japanese Patent Application Laid-Open No. 2005-219641

SUMMARY OF THE INVENTION

Problems to be Solved by the Invention

In the steering apparatus disclosed in Japanese Patent Application Laid-Open No. 2007-38822, when the steering apparatus is attached to the vehicle body, it is necessary that the vehicle-mounting bracket, which is in the steering apparatus side, is fixed to the vehicle-body-side bracket and an end of the wire is fixed to the vehicle-body-side bracket. Accordingly, the work for attaching to the vehicle body is troublesome, thereby increasing in assembling time.

In the steering apparatus disclosed in Japanese Patent Application Laid-Open No. 2005-219641, an end of a wire is fixed to a vehicle-body-side bracket, which is fixed to the vehicle body, and the wire is made plastic deformation caused by movement of a connecting member detached from the vehicle-body-side bracket frontward with respect to the vehicle body upon a secondary collision, thereby absorbing an impact load.

In the steering apparatus disclosed in Japanese Patent Application Laid-Open No. 2005-219641, the connecting member is fixed to the wire, and the wire is made plastic deformation caused by movement of the connecting member frontward with respect to the vehicle body, thereby absorbing an impact load. Accordingly, the connecting member has to be constructed to have a shape capable of connecting to the wire, thereby arising a design restriction.

Means for Solving the Problems

The present invention has an object to provide a steering apparatus not necessary to fix an end of an impact-energy-absorption member to a vehicle-body-side bracket upon attaching the steering apparatus to the vehicle body, or not restricting a shape of a connecting member by the impact-energy-absorption member.

The above-described object is achieved by the following ways. The present invention provides, in a steering apparatus comprising: a lower column that can be fixed to a vehicle body by front side thereof with respect to the vehicle body; an upper column that is fitted to the lower column in such a way as to be able to move frontward with respect to the vehicle body and rotatably supports a steering shaft on which a steering wheel is attached; an upper bracket that can be attached to the vehicle body, and can move in such a way that it can be detached forward with respect to the vehicle body together with the upper column by an impact force upon a secondary collision; and an impact-energy-absorption member that absorbs impact energy by making plastic deformation with fitting to the upper bracket upon moving the upper bracket frontward with respect to the vehicle body; the improvement comprises; a guide bracket that is fixed to the lower column by front side thereof with respect to the vehicle body, extends rearward with respect to the vehicle body along the lower column, and has a guide groove that guides the movement of the upper column upon a secondary collision; a guide pin that is fixed to the upper bracket and can move with the upper bracket with the outer circumferential surface of its shaft portion being guided by the guide groove, the guide bracket having a gap setting portion that forms a gap extending front and rear direction with respect to the vehicle body between the guide bracket and the upper bracket, and the guide groove is formed on the gap setting portion, and the impact-energy-absorption member being latched to the guide bracket, and includes an extending portion that extends in the gap between the gap setting portion of the guide bracket and the upper bracket.

According to a preferred aspect of the present invention, there is provided the steering apparatus further including the extending portion of the impact-energy-absorption member includes a pair of first extending portions that extend frontward with respect to the vehicle body and a connecting portion that connects the pair of the first extending portions at rearward with respect to the vehicle body of the upper bracket, and the impact-energy-absorption member includes a pair of U-shape bending portions each connecting to the first extending portion at frontward with respect to the vehicle body of the upper bracket, and a pair of second extending portions that are disposed between the upper bracket and the upper column, and extend rearward with respect to the vehicle body with connecting the pair of U-shape bending portions, respectively.

According to a preferred aspect of the present invention, there is provided the steering apparatus in which each rearward end with respect to the vehicle body of the first extending portion in the impact-energy-absorption member is latched to the guide bracket, and each of the U-shape bending portions is latched to the upper bracket upon moving the upper bracket frontward with respect to the vehicle body.

According to a preferred aspect of the present invention, there is provided the steering apparatus in which the guide pin is only one and disposed between the first extending portions.

According to a preferred aspect of the present invention, there is provided the steering apparatus in which a gap is provided between the frontward end with respect to the vehicle body of the upper bracket and each of the U-shape bending portions in the impact-energy-absorption member.

According to a preferred aspect of the present invention, there is provided the steering apparatus in which a pair of latching grooves for latching rearward ends with respect to the vehicle body of the first extending portions of the impact-energy-absorption member are formed on the rearward end with respect to the vehicle body of the guide bracket.

According to a preferred aspect of the present invention, there is provided the steering apparatus in which the impact-energy-absorption member is formed with bending a wire made of a metal.

According to a preferred aspect of the present invention, there is provided the steering apparatus in which each of the latching grooves formed on the guide bracket has a linear groove portion extending frontward with respect to the vehicle body and a bent groove portion bending by right angle at the frontward end with respect to the vehicle body of the linear groove portion, and the bent groove portions are facing the same direction.

According to a preferred aspect of the present invention, there is provided the steering apparatus in which each of the latching grooves formed on the guide bracket has a linear groove portion extending frontward with respect to the vehicle body and a bent groove portion bending by right angle at the frontward end with respect to the vehicle body of the linear groove portion, and the bent groove portions are facing with each other.

According to a preferred aspect of the present invention, there is provided the steering apparatus in which each of the latching grooves formed on the guide bracket has a narrow-width-linear-groove portion that extends frontward with respect to the vehicle body and has a width narrower than the width of the first extending portion, and a wide-width-linear-groove portion that extends frontward with respect to the vehicle body of the narrow-width-linear-groove portion and has a width wider than the narrow-width-linear-groove portion.

A steering apparatus according to the present invention makes it possible to easily attach an impact-energy-absorption member to the steering apparatus. Accordingly, upon attaching the steering apparatus to the vehicle body, the work for attaching an end of the impact-energy-absorption member to the vehicle body is not necessary, so that the work for attaching the steering apparatus to the vehicle body becomes easy and the work time can be shortened. Moreover, since the impact-energy-absorption member is installed in the steering apparatus, an impact absorbing load can be stabilized. Furthermore, since a connecting member and the impact-energy-absorption member are not necessary to be attached with each other, a shape of the connecting member is not restricted by the impact-energy-absorption member.

MODES FOR CARRYING OUT THE INVENTION

An embodiment of the present invention is explained below with reference to accompanying drawings.

Figure 1:
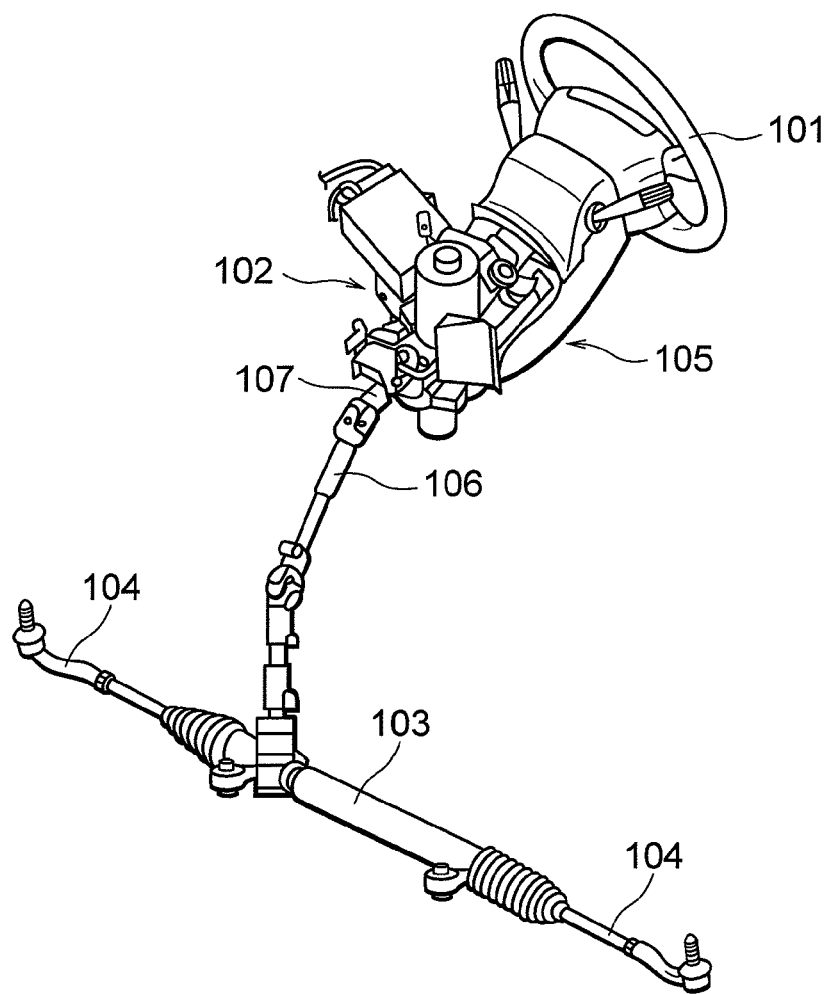
FIG. 1 is an overall perspective view of a steering apparatus according to an embodiment of the present invention.

FIG. 1 is an overall perspective view of a steering apparatus according to the embodiment of the present invention. As shown in FIG. 1, the steering apparatus according to the embodiment of the present invention is a column-assist type power steering apparatus. In order to lighten the hand effort in operating a steering wheel 101, the column-assist, rack-pinion type power steering apparatus shown in FIG. 1 is adapted to apply a steering assisting force generated by the electric assist mechanism 102 attached to a column assembly 105 onto an output shaft 107 to move the rack of a rack-pinion type steering gear assembly 103 in two opposite directions, thereby steering the steer wheels via tie rods 104.

Figure 2:
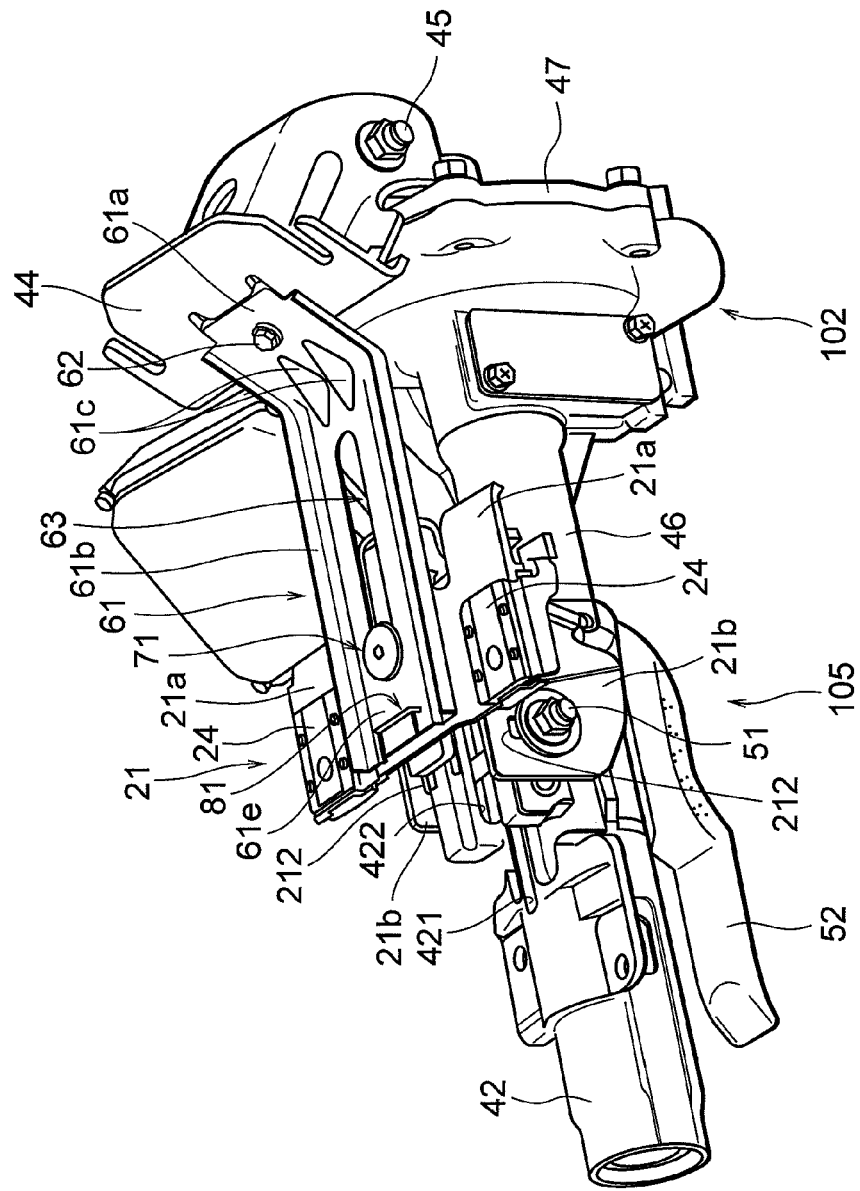
FIG. 2 is a perspective view of the relevant portions of the steering apparatus according to the embodiment of the present invention, seen from above right from the rear of the vehicle body.
Figure 3:
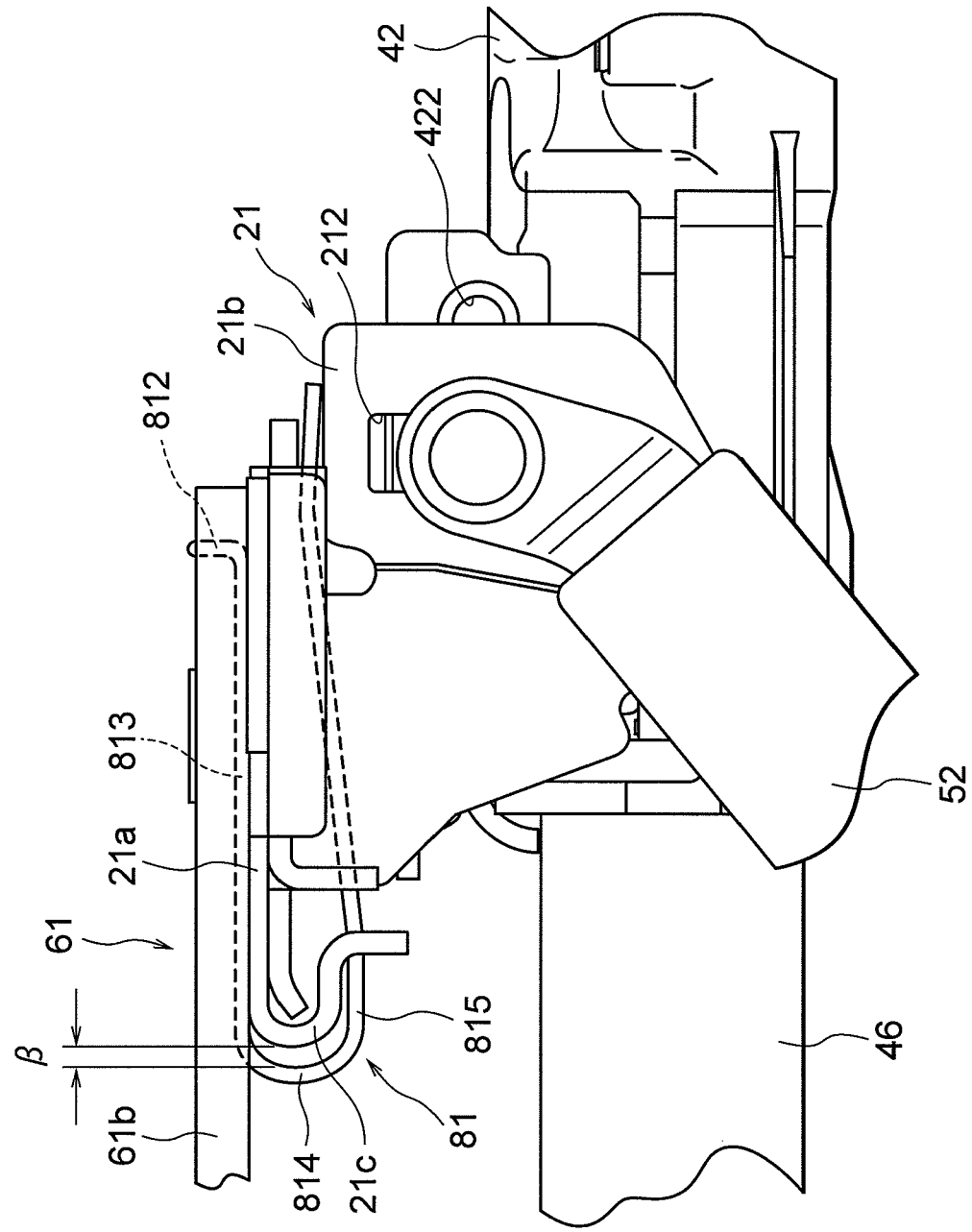
FIG. 3 is a side view of a guide bracket in FIG. 2, showing its rear portion with respect to the vehicle body, seen from the left side in the vehicle width direction.
Figure 4:
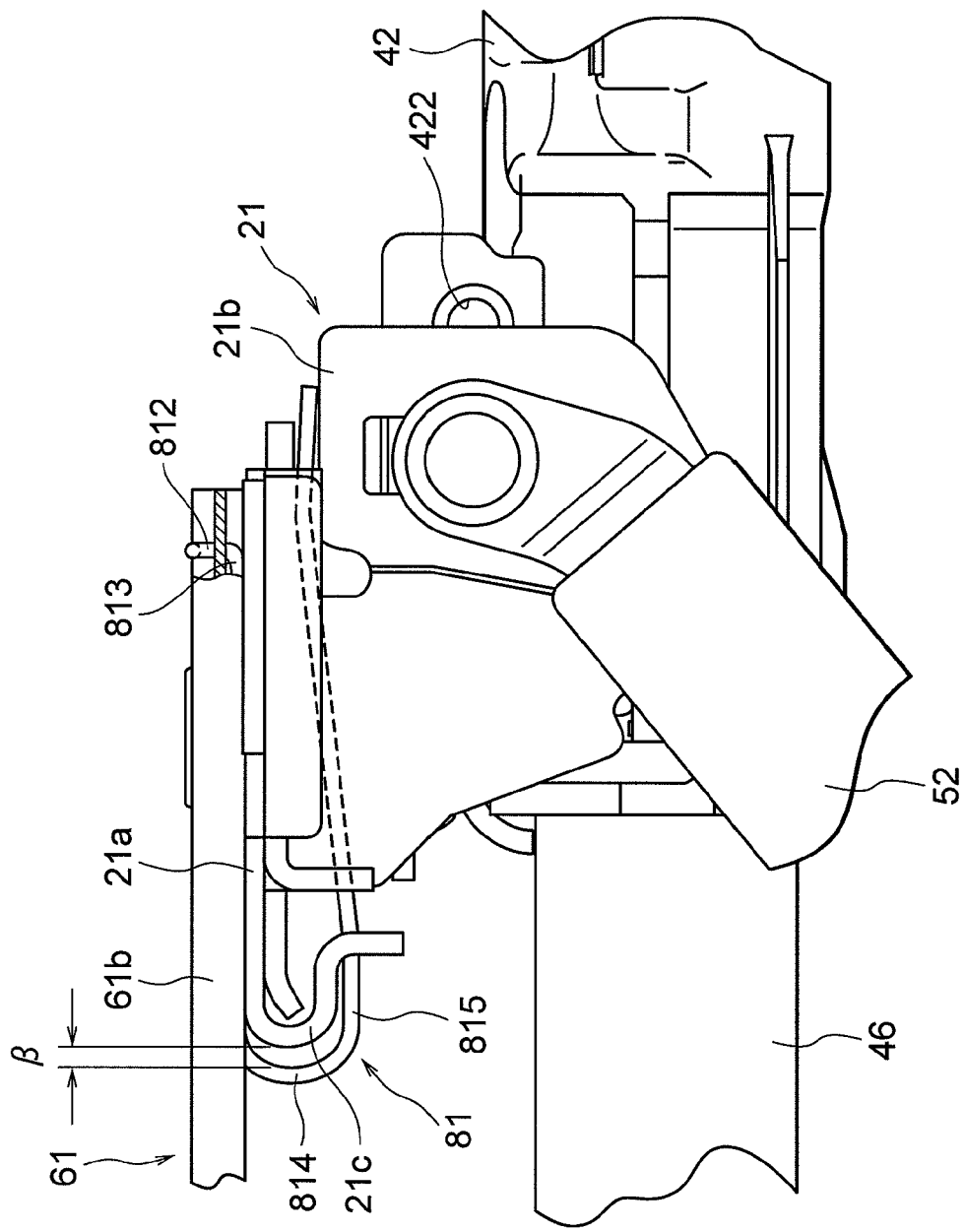
FIG. 4 is a side view showing a wire-fixing portion of the guide bracket in FIG. 3 by a section, seen from the left side in the vehicle width direction.
Figure 5:
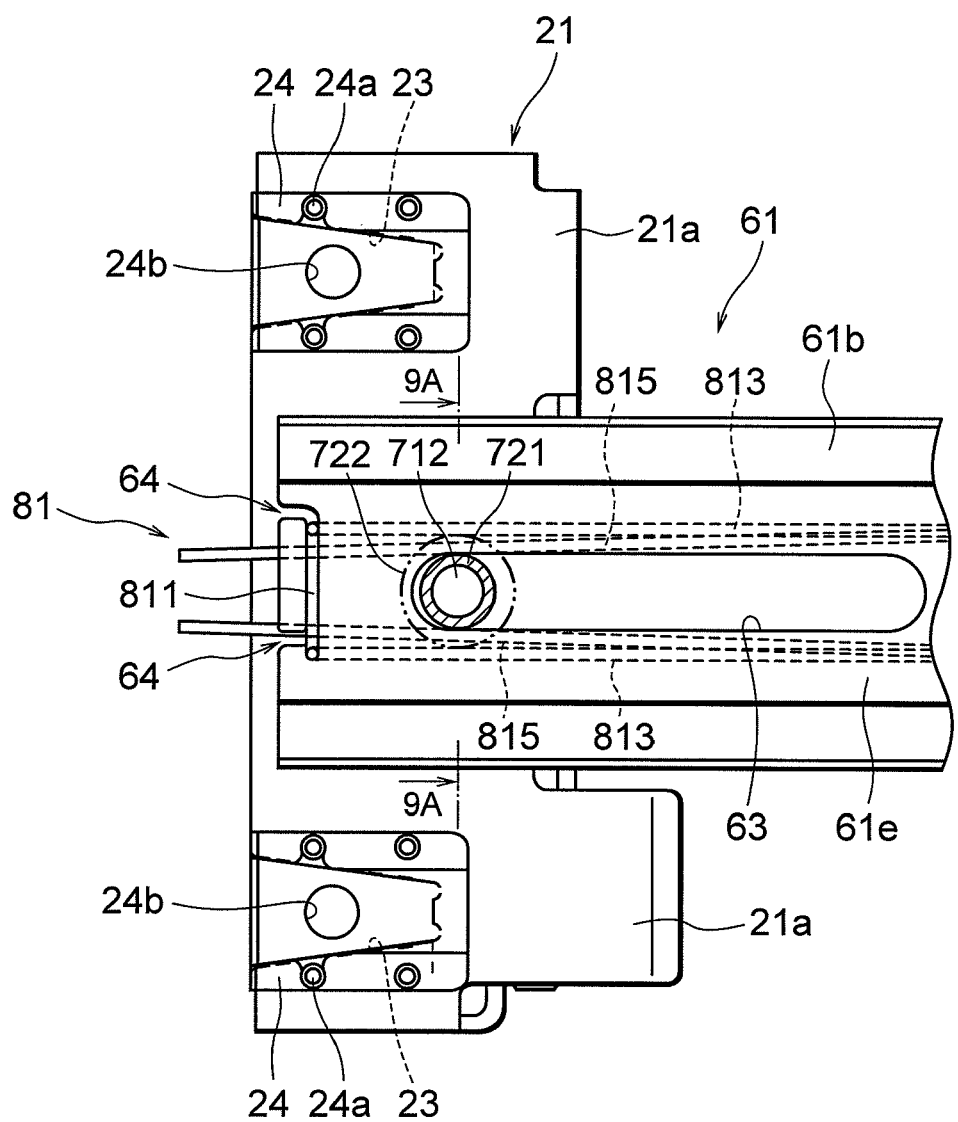
FIG. 5 is a plan view of the guide bracket in FIG. 2, showing its rear portion with respect to the vehicle body.
Figure 6:
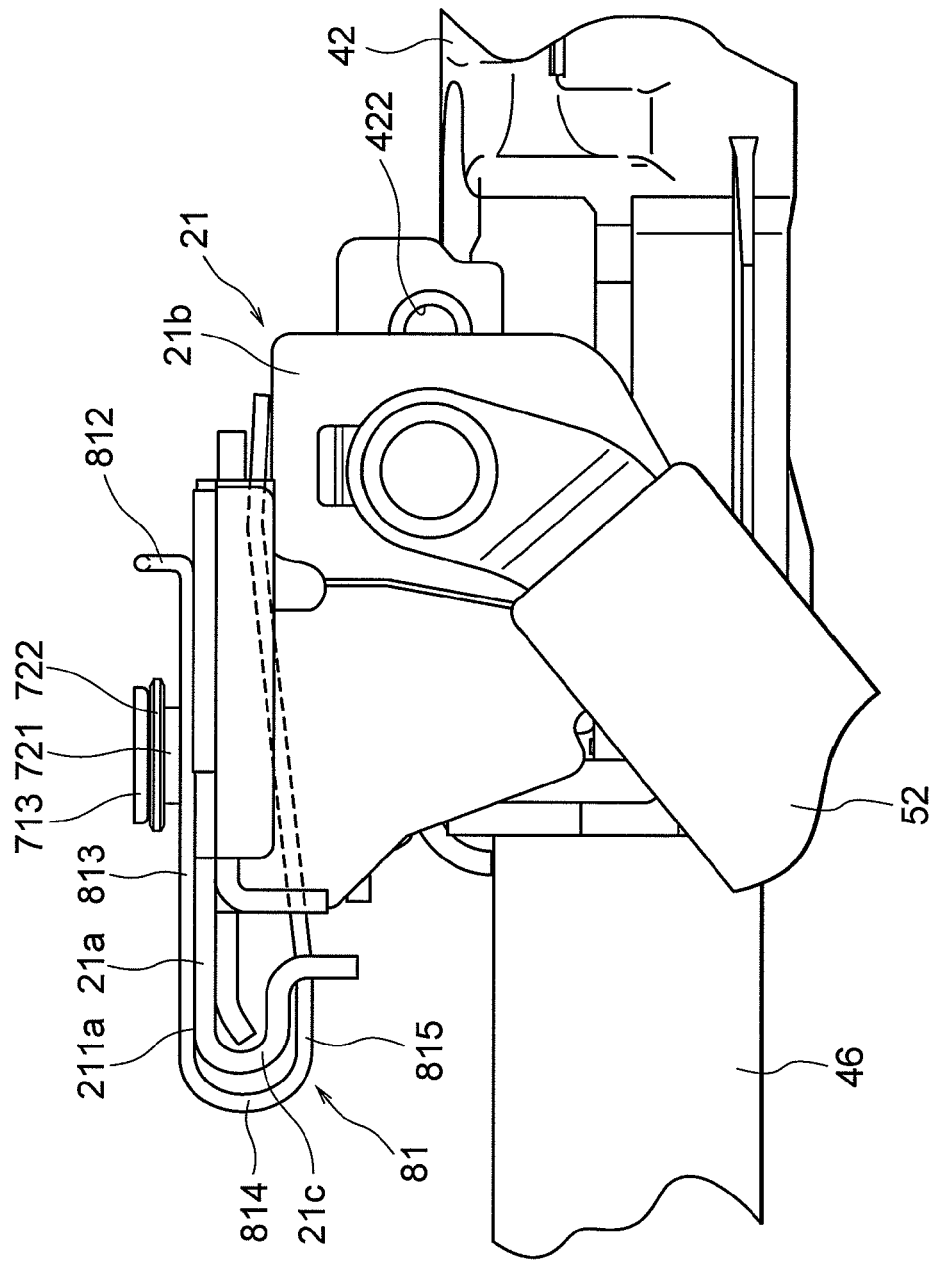
FIG. 6 is a side view showing a state where the guide bracket is removed from FIG. 3, seen from the left side in the vehicle width direction.

FIG. 2 is a perspective view of the relevant portions of the steering apparatus according to the embodiment of the present invention seen from above right of the rear of the vehicle body. FIG. 3 is a side view of a guide bracket in FIG. 2, showing its rear portion with respect to the vehicle body, seen from the left side in the vehicle width direction. FIG. 4 is a side view showing a wire-fixing portion of the guide bracket in FIG. 3 by a section, seen from the left side in the vehicle width direction. FIG. 5 is a plan view of the guide bracket in FIG. 2, showing its rear portion with respect to the vehicle body. FIG. 6 is a side view with removing the guide bracket from FIG. 3, seen from the left side in the vehicle width direction.

Figure 7:
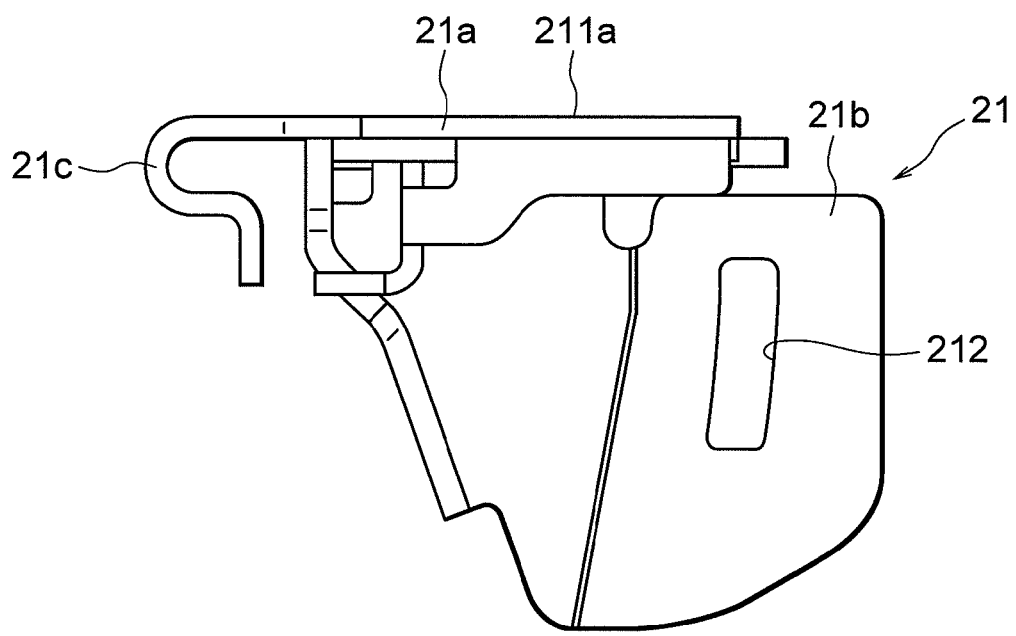
FIG. 7 is a side view showing an upper bracket alone in FIG. 3, seen from the left side in the vehicle width direction.
Figure 8:
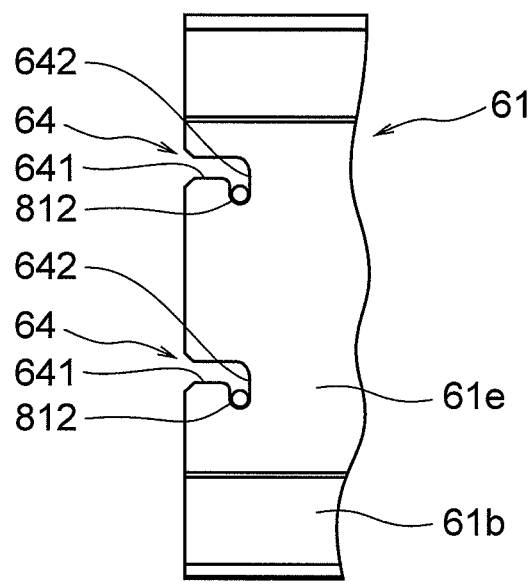
FIG. 8 is a plan view of the guide bracket showing its rear portion with respect to the vehicle body.
Figure 9A:
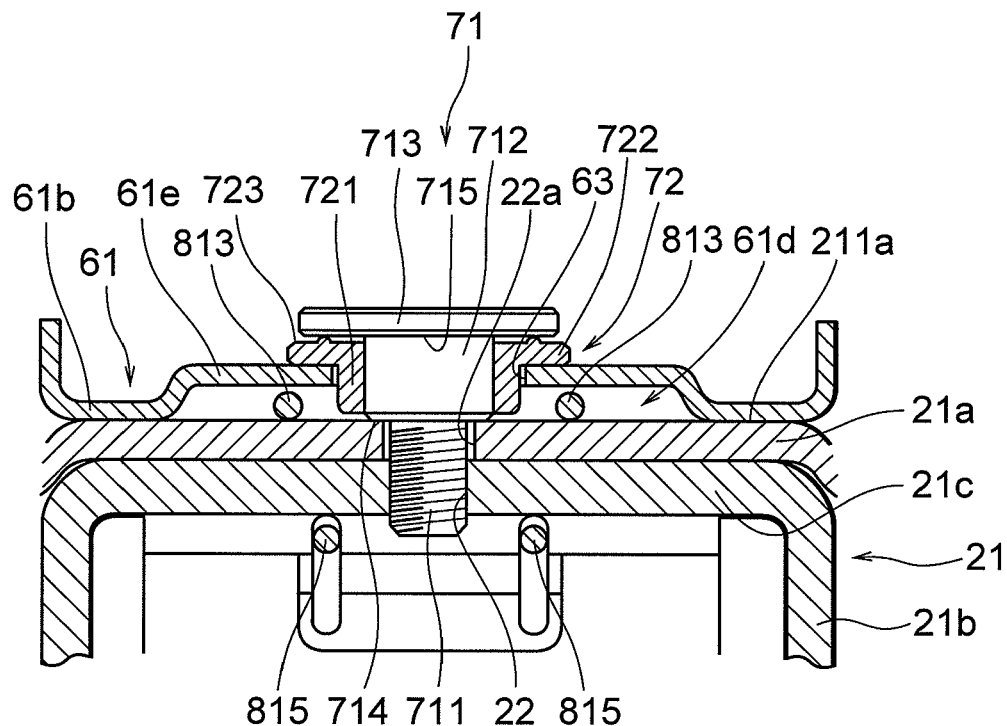
FIG. 9A is a cross sectional view taken along line 9A-9A in FIG. 5 showing the portion in which a resin spacer and the guide groove are in contact.
Figure 9B:
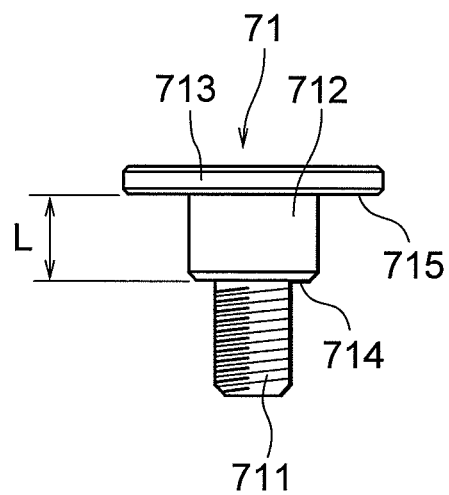
FIG. 9B is a front view showing a guide pin alone shown in FIG. 9A.
Figure 10:
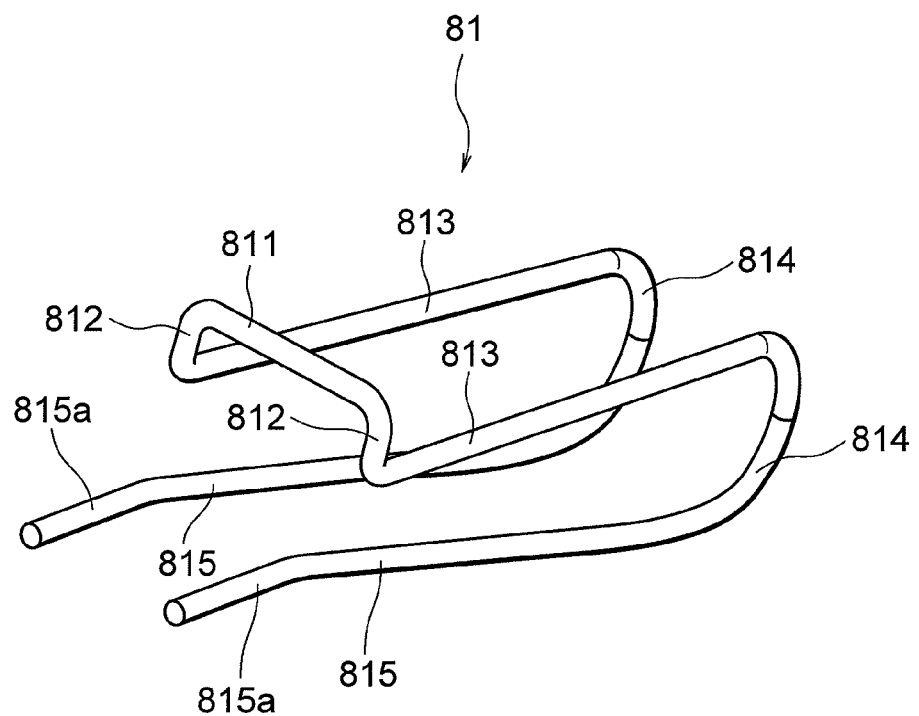
FIG. 10 is a perspective view showing a metal wire, which is an impact-energy-absorption member.
Figure 13:
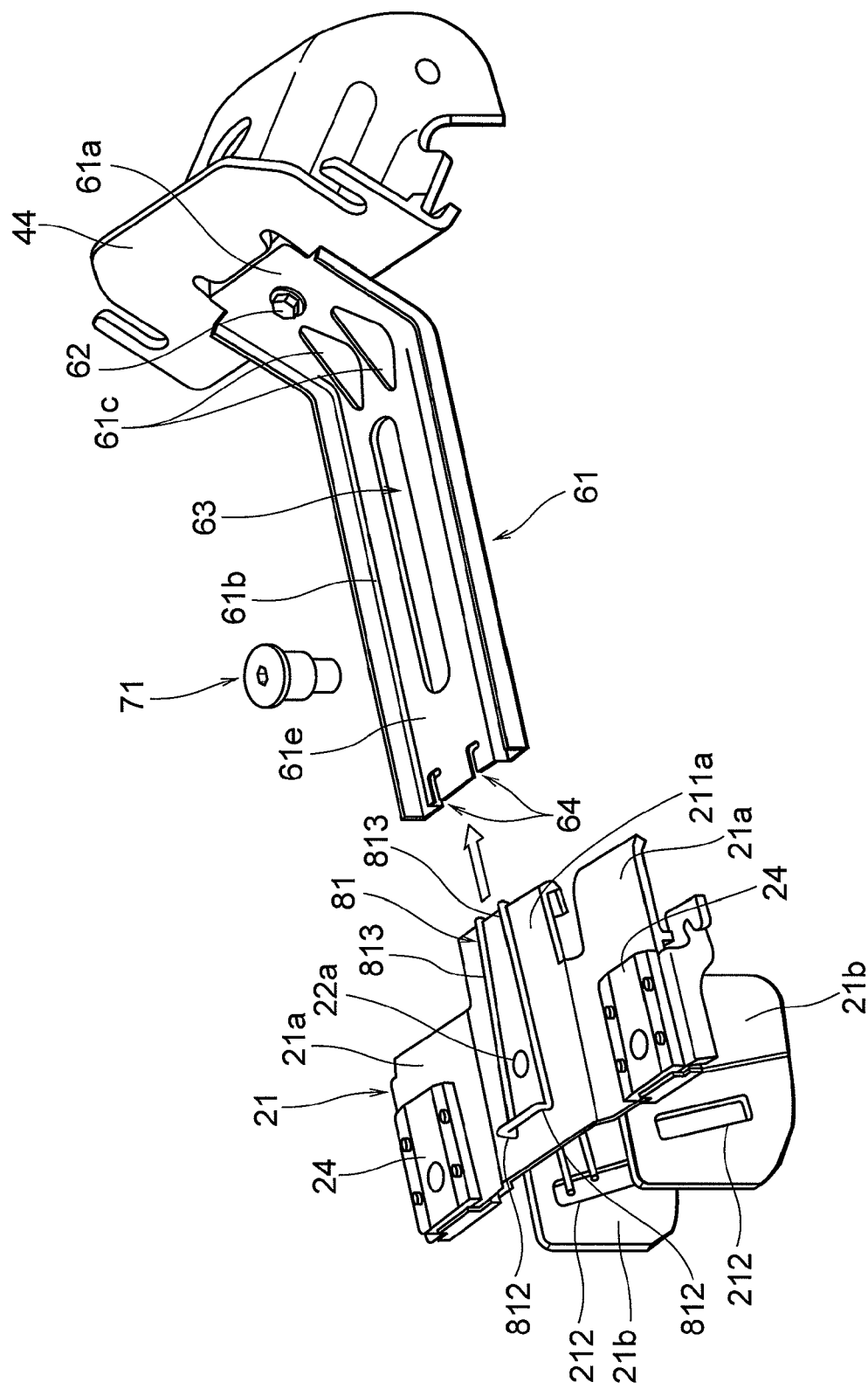
FIG. 13 is a perspective view showing a state where the upper bracket is assembled to the guide bracket.

FIG. 7 is a side view showing an upper bracket alone in FIG. 3, seen from the left side in the vehicle width direction. FIG. 8 is a plan view of the guide bracket showing its rear portion with respect to the vehicle body. FIG. 9A is a cross sectional view taken along line 9A-9A in FIG. 5 showing the portion in which a resin spacer and the guide groove are in contact. FIG. 9B is a front view showing a guide pin alone shown in FIG. 9A. FIG. 10 is a perspective view showing the metal wire. FIG. 13 is a perspective view showing a state where the upper bracket is assembled to the guide bracket.

As shown in FIGS. 2 through 10, the column assembly 105 is composed of an upper column 42, which is the outer column, and a lower column 46, which is the inner column disposed on the front side (with respect to the vehicle body) of the upper column 42. A steering shaft (not shown) on which the steering wheel 101 shown in FIG. 1 is attached is rotatably supported on the rear side (with respect to the vehicle body) of the cylindrical upper column 42. The upper column 42 is guided by long grooves 212, 212 shown in FIGS. 2, 3 and 7 for tilt adjustment formed through side plates 21b, 21b of an upper bracket 21, which constitutes an upper vehicle-mounting bracket mounted on the vehicle body, to allow tilt adjustment.

The lower column 46 is internally fitted into the upper column 42 from the front with respect to the vehicle body (from right in FIG. 2) in such a way as to be able to move in a telescopic manner in the direction along its axis. A gear housing 47 of the electric assist mechanism 102 is attached to the front end (with respect to the vehicle body) of the lower column 46. A lower bracket 44, which constitutes a lower vehicle-mounting bracket, is attached on the upper (with respect to the vehicle body) portion of the gear housing 47. The lower bracket 44 is fixedly attached to the vehicle body (not shown) and supported in such a way that it can swing about a tilt center shaft 45 to allow tilt adjustment.

The upper column 42 has a slit 421 provided on its upper portion, from which the slit 421 is formed through the upper column 42 to its inner surface. The upper column 42 integrally has a member on which long grooves 422, 422 for telescopic adjustment having a longitudinal axis extending in parallel with the center axis of the upper column 42 are provided.

A fastening rod 51 passes through long grooves for tilt adjustment 212, 212 and the long grooves for telescopic adjustment 422, 422. An operation lever 52 is attached to an end of the fastening rod 51. The operation lever 52 is used to operate a movable cam and a fixed cam (not shown), which constitute a cam lock mechanism.

The upper column 42 is fastened (or clamped) on its sides by the side plates 21b, 21b of the upper bracket 21 by swinging the operation lever 52. With such fastening/loosening operation, the upper column 42 is clamped to/unclamped from the upper bracket 21. The adjustment of the tilt position of the upper column 42 is performed in the unclamped state. The fastening operation causes the diameter of the upper column 42 to decrease, thereby causing the inner circumferential surface of the upper column 42 to clamp the outer circumferential surface of the lower column 46/the loosening operation unclamps the outer circumferential surface of the lower column 46. The adjustment of the telescopic position of the upper column 42 is performed in the unclamped state.

The output shaft 107 (shown in FIG. 1) projecting frontward (with respect to the vehicle body) from the gear housing 47 is coupled to a pinion engaging with a rack shaft of the steering gear assembly 103 via an intermediate shaft 106 to transmit rotational operation of the steering wheel 101 to the steering apparatus.

The upper bracket 21 is fixedly attached to the vehicle body (not shown) in such a manner that it can be detached upon a secondary collision. As shown in FIG. 9A, the upper bracket 21 is composed of the aforementioned side plates 21b, 21b, an upper plate 21c provided above the side plates 21b, 21b in the vehicle body and bridging them integrally, and flanges 21a, 21a fixedly provided on the upper surface of the upper plate 21c to extend rightward and leftward. As shown in FIG. 5, the structure for attaching the upper bracket 21 to the vehicle body includes two cut grooves 23, 23 provided in pair on the right and left flanges 21a, 21a and capsules 24, 24 fitted to both edges of the cut grooves 23, 23. The cut grooves 23, 23 are symmetrical in structure along the width direction of the vehicle body (vertical direction in FIG. 5) with respect to the center axis of the upper column 42. The capsules 24, 24 hold or sandwich the flanges 21a, 21a from above and below (with respect to the vehicle body).

The upper bracket 21 and the upper column 42 are made of an electrically conductive material such as a metal. The cut grooves 23, 23 open rearward (with respect to the vehicle body) on the flange 21a. The width of the cut grooves 23, 23 along the vertical direction in FIG. 5 or along the width direction of the vehicle body gradually increases from the front to rear (with respect to the vehicle body). This allows easy detachment of the upper bracket 21 from the capsules 24, 24 upon a secondary collision.

The capsules 24, 24 fitted to the cut grooves 23, 23 are made of an electrically conductive material such as a metal or light alloy like aluminum or die-cast zinc alloy. The capsules 24, 24 are each attached to the flange 21a by four shear pins 24a. In addition, the capsules 24, 24 are fixed to the vehicle body by bolts (not shown) passing through bolt holes 24b provided in the capsules 24.

As the driver hits the steering wheel 101 upon a secondary collision to exert a strong impact force on it in the forward direction with respect to the vehicle body, the shear pins 24a shear, and the flange 21a of the upper bracket 21 is detached from the capsules 24 and makes a collapsing movement or move forward with respect to the vehicle body or rightward in FIGS. 2 and 5, or leftward in FIG. 3. Then, the upper column 42 makes a collapsing movement or moves forward with respect to the vehicle body along the lower column 46 and collapses an impact-energy-absorption member (explained later) to absorb the impact energy of the collision. Upon a secondary collision, the upper column 42 and the upper bracket 21 etc. will move while collapsing the impact-energy-absorption member. Such a movement is referred to as "collapsing movement" and described as "they (it) make a collapsing movement or move forward" in this specification.

As shown in FIG. 2, an attaching portion 61a provided at the front end (with respect to the vehicle body) of the guide bracket 61 is fixed to the lower bracket 44 by a bolt 62. The guide bracket 61 is constructed by bending a metal plate. The attaching portion 61a is arranged to extend in the vertical direction in the vehicle body along the lower bracket 44. At the lower end (with respect to the vehicle body) of the attaching portion 61a, there is provided a guide portion 61b that is bent in an L-shape and extends rearward with respect to the vehicle body. Triangular ribs 61c, 61c connecting the attaching portion 61a and the guide portion 61b are provided in the joining portion of the attaching portion 61a and the guide portion 61b to enhance the rigidity of the guide bracket 61.

The guide portion 61b is disposed a little above (in the vehicle body) the flange 21a of the upper bracket 21 and extends rearward with respect to the vehicle body from the attaching portion 61a along the lower column 46 in parallel to the lower column 46. The guide portion 61b has a length large enough to reach the vicinity of the rear end (with respect to the vehicle body) of the flange 21a. As shown in FIGS. 2 and 9A, the guide portion 61b has, in the central portion with respect to the width direction of the vehicle body, a flat plate portion 61e constituting a flat portion lifted upward (with respect to the vehicle body). The flat plate portion 61e extends rearward (with respect to the vehicle body) from the lower end (with respect to the vehicle body) of the front (with respect to the vehicle body) attaching portion 61a. There is a predetermined gap 61d between the flat plate portion 61e and the flange 21a of the upper bracket 21. The flat plate portion 61e has, in the central portion with respect to the width direction of the vehicle body, a guide groove 63 for guiding the collapsing movement of the upper bracket 21. The guide groove 63 extends in parallel to the center axis of the lower column 46.

If a later-described guide pin 71 were to be attached to the upper bracket 21 in the state in which no gap 61*d* is left between the flat plate portion 61*e* and the flange 21*a*, an error, if any, in the dimension of the thickness of the guide bracket 61 and/or the upper bracket 21 would prevent appropriate tightening of the guide pin 71. In view of this, in the present embodiment, a gap 61*d* is left between the flat plate portion 61*e* and the flange 21*a*, thereby preventing the above situation even if there is a dimension error in the guide bracket 61 etc. to allow appropriate tightening of the guide pin 71. Leaving a gap 61*d* between the flat plate portion 61*e* and the flange 21*a* leads to a decrease in the contact area between the guide bracket 61 and the upper bracket 21 and allows a non-contact arrangement of the guide bracket 61 and the upper bracket 21 in the region near the guide pin 71. Therefore, the frictional resistance between the guide bracket 61 and the upper bracket 21 can be made lower. Moreover, with providing the gap 61*d* between the flat plate portion 61*e* and the flange 21*a*, upper extending portion 813, 813 of the metal wire, which is the impact-energy-absorption member, can be disposed in the gap 61*e* as explained later.

The guide groove 63 is arranged to extend in parallel to the center axis of the lower column 46. As shown in FIG. 9A, the flange 21*a* of the upper bracket 21 has a through hole 22*a* provided in its central portion with respect to the vehicle width direction. A female screw 22 is formed on the upper plate 21*c* opposite to the through hole 22*a*. The guide pin 71 shown in FIG. 9B is inserted through the guide groove 63 from above (with respect to the vehicle body), and the male screw 711 at the lower end of the guide pin 71 is screwed into the female screw 22, thereby fixing the guide pin 71 to the upper plate 21*c*.

The guide pin 71 is integrally composed of the male screw 711, a cylindrical shaft portion 712 provided on top of the male screw 711 and having a diameter larger than the male screw 711, and a disk-like head portion 713 provided on top of the shaft portion 712 and having a diameter larger than the shaft portion 712. The guide pin 71 is made of a metal such as iron. A spacer 72 made of a synthetic resin and having a hollow cylindrical shape is externally fitted on the outer circumference of the shaft portion 712. The spacer 72 is made of polyacetal also known by the abbreviated name POM, which has a small friction coefficient and good mechanical properties. The spacer 72 has a lower (with respect to the vehicle body) cylinder portion 721 and a disk-like flange portion 722 provided on top of the cylinder portion 721 and having a diameter larger than the cylinder portion 721.

As the male screw 711 of the guide pin 71 is screwed into the female screw 22, the shoulder surface 714 at the lower end (with respect to the vehicle body) of the shaft portion 712 comes into abutment with an upper surface 211*a* of the flange 21*a* to stop. In consequence, the lower surface 715 of the head portion 713 of the guide pin 71 presses the upper surface 723 of the flange portion 722 of the spacer 72. Therefore, the length of the gap between the lower surface 715 and the upper surface 211*a* is determined by the guide pin 71 that is manufactured in such a way that it has a predetermined length L between the lower surface 715 of the head portion 713 and the shoulder surface 714.

As the lower surface 715 of the head portion 713 of the guide pin 71 presses the upper surface 723 of the flange portion 722 of the spacer 72 by predetermined pressing force as described above, the upper bracket 21 is attached to the guide bracket 61 without play, and the collapse load of the upper bracket 21 can be set to a predetermined load. The spacer 72 also has the function of eliminating noises that would otherwise be generated by direct interference of the guide pin 71 and the flat plate portion 61*e* of the guide bracket 61 caused by vibration or other reasons. Furthermore, the spacer 72 can eliminate variations in collapse load that might result, for example, from small deformation of the guide bracket 61, dimension errors of the guide groove 63, and/or blanking burr on the guide groove 63 made by pressing in the process of manufacturing the guide bracket 61. The spacer 72 also has the function of reducing the twisting load on the upper bracket 21 or a load acting on the upper bracket 21 in the rotational direction about the guide pin 71.

As shown in FIGS. 5 and 8, latching grooves 64, 64 for latching the metal wire 81, which is the impact-energy-absorption member shown in FIG. 10, is formed on the rear end (with respect to the vehicle body) of the guide bracket 61. The latching groove 64 is opened rearward with respect to the vehicle body and is composed of a linear groove portion 641 extending frontward (with respect to the vehicle body) in parallel to the center axis of the lower column 46 and a bent groove portion 642 formed with bending at right angle rightward (with respect to the vehicle body), which is downward in FIG. 8, at a front (with respect to the vehicle body) end of the linear groove portion 641.

As shown in FIG. 10, the wire 81 is made of a metal and formed by bending a narrow line having a circular section. The wire 81 is composed of a horizontal portion 811, vertical portions 812, 812, upper extending portions 813, 813, folding portions 814, 814, and lower extending portions 815, 815. The vertical portions 812, 812 are formed with extending vertically downward (with respect to the vehicle body) from both ends in the vehicle width direction of the horizontal portion 811. The upper extending portions 813, 813 are formed with extending frontward (with respect to the vehicle body) in parallel to the center axis of the lower column 46 from the lower ends of the vertical portions 812, 812.

The folding portions 814, 814 are formed with extending downward (with respect to the vehicle body) at front (with respect to the vehicle body) ends of the upper extending portions 813, 813. The lower extending portions 815, 815 extending rearward (with respect to the vehicle body) are formed from the lower ends of the folding portions 814, 814. In other words, the wire 81 is formed symmetrically in the vehicle width direction with respect to the center axis of the lower column 46. Incidentally, the lower extending portions 815, 815 of the wire 81 are inclined upward (with respect to the vehicle body) such a manner that their rearward (with respect to the vehicle body) ends 815*a*, 815*a* make in contact with the lower surface of the upper plate 21*c* of the upper bracket 21.

As shown in FIG. 6, the wire 81 is inserted to the upper bracket 21 from the front (with respect to the vehicle body) side, which is the left side in FIG. 6, to the rear (with respect to the vehicle body) side, which is the right side in FIG. 6. In other words, before fixing the guide bracket 61 to the lower bracket 44, the upper extending portions 813, 813 of the wire 81 are inserted along the upper surface 211*a* of the upper bracket 21 from the front (with respect to the vehicle body) side to the rear (with respect to the vehicle body) side as shown in FIG. 13. In this manner, the wire 81 provides the upper extending portions 813, 813, the folding portions 814, 814, and the lower extending portions 815, 815 inclined upward (with respect to the vehicle body), and holds or sandwiches the flange 21*a* and the upper plate 21*c* of the upper bracket 21 from above and below by the upper extending portions 813, 813 and the lower extending portions 815, 815, so that the ends 815a, 815a become guides upon inserting the wire 81 into the upper bracket 21. Accordingly, it becomes easy to assemble.

Then, after fixing the guide bracket 61 to the lower bracket 44 with tightening the bolt 62 to the lower bracket 44, the upper bracket 21 is fixed to the guide bracket 61 as shown in FIG. 13. In this instance, the vertical portions 812, 812 of the wire 81 are inserted into the latching grooves 64, 64 to be latched to the bent groove portions 642, 642 as shown in FIGS. 5 and 8. Since the wire 81 is latched by the bent groove portions 642, 642, the wire 81 becomes difficult to be released from the latching grooves 64, 64 caused by impact during driving or upon collision, as well as play of the wire 81 in back and forth (with respect to the vehicle body) direction can be suppressed. With using the wire 81 made of a wire rod having a circular section as an impact-energy-absorption member, the wire 81 can be moved smoothly from the linear groove portions 641, 641 to the bent groove portions 642, 642 of the latching grooves 64, 64, so that the wire 81 can be smoothly latched to the bent groove portions 642, 642. Moreover, upon assembling the upper bracket 21 to the guide bracket 61, the flange 21a of the upper bracket 21 and the upper plate 21c can be held or sandwiched by the wire 81 from above and below as described above, so that the wire 81 can be assembled in a state temporary being held by the guide bracket 61. Accordingly, it becomes easy to assemble. Lastly, the guide pin 71 is attached to the upper bracket 21 through the guide groove 63 of the guide bracket 61 as shown in FIG. 13.

As shown in FIGS. 3, 4, 6 and 7, the frontward (with respect to the vehicle body) end of the flange 21a of the upper bracket 21 is bent downward (with respect to the vehicle body) in a circular arc shape to form an R-shape portion 21c. When the vertical portions 812, 812 are fitted to the bent groove portions 642, 642 of the guide bracket 61, a gap β is formed between the folding portion 814 of the wire 81 and the R-shape portion 21c of the flange 21a. Incidentally, since the position in the front and rear (with respect to the vehicle body) direction of the wire 81 can be restricted by the bent groove portions 642, 642 as described above, the dimension of the gap β can be stably secured.

As shown in FIG. 9A, the flat plate portion 61e of the guide bracket 61 is formed with protruding upward (with respect to the vehicle body) higher than the upper surface 211a of the upper bracket 21, and forms a gap 61d in up and down (with respect to the vehicle body) direction between the flat plate portion 61e and the upper surface 211a. The upper extending portions 813, 813 of the wire 81 are passed through the gap 61d. Both ends in the vehicle width direction of the flat plate portion 61e are bent downward (with respect to the vehicle body) and come into contact with the upper surface 211a of the upper bracket 21. Since the upper extending portions 813, 813 of the wire 81 pass through outside in the vehicle width direction of the cylinder portion 721 of the spacer 72, the shape of the guide pin 71 is not restricted by the wire 81.

In this manner, after completion of assembling the steering apparatus, the lower bracket 44 shown in FIG. 2 is fixed to vehicle body. Then, fitting the steering apparatus to the vehicle body is completed. An end of the wire 81 is fixed to the guide bracket 61 which is fixed to the lower bracket 44. Accordingly, upon fixing the steering apparatus to the vehicle body, work for fixing an end of the wire 81 to the vehicle body becomes not necessary, the work for fixing the steering apparatus to the vehicle body becomes easy, so that work time for fixing can be shortened.

As the driver hits the steering wheel 101 upon a secondary collision to exert strong impact force on it in the forward direction with respect to the vehicle body, the shear pins 24a shear, and the flange 21a of the upper bracket 21 is detached from the capsules 24 and makes a collapsing movement or moves forward with respect to the vehicle body, which is rightward in FIGS. 2 and 5, or leftward in FIG. 3. Then, the guide pin 71 together with the spacer 72 makes a collapsing movement or moves forward with respect to the vehicle body.

Then, the R-shape portion 21c of the flange 21a of the upper bracket 21 comes into contact with the folding portion 814 of the wire 81, makes a collapsing movement or moves forward with respect to the vehicle body with making plastic deformation of the wire 81, and absorbs impact energy of the collision. Moreover, since the spacer 72 is made of a synthetic resin, there is no metallic contact between the guide groove 63 and the guide pin 71, leading to low friction coefficient between the guide groove 63 and the cylinder portion 721 of the spacer 72. Therefore, the performance in absorbing the impact energy upon a secondary collision is stable, and the impact load absorption characteristics can be set accurately.

As described above, the gap β shown in FIGS. 3 and 4 is provided between the folding portion 814 of the wire 81 and the R-shape portion 21c of flange 21a. Accordingly, impact load upon hitting the driver to the steering wheel 101 is at first absorbed by the capsules 24, 24, and, after moving the upper bracket 21 forward (with respect to the vehicle body) by the amount of the gap β, further absorbed by the wire 81. In this manner, with shifting timing of applying impact load on the capsule 24 from that on the wire 81, initial load of impact absorbing load can be lowered, so that impact applied on the driver can be lowered. Moreover, as described above, since the dimension of the gap β is stably secured by fixing the wire 81 to the bent groove portions 642, 642 of the guide bracket 61, stable impact absorption load can be generated. Moreover, in the wire 81, the upper extending portions 813, 813 are stored in the gap 61d between the flat plate portion 61e of the guide bracket 61 and the upper surface 211a of the upper bracket 21, and the lower extending portions 815, 815 are stored between the upper column 42 and the upper bracket 21. Accordingly, since the wire 81 is not affected from external force or an obstacle upon making plastic deformation by the collision, it becomes possible to make stable plastic deformation, so that stable impact absorption load can be generated.

The guide pin 71 is disposed at the center in the vehicle width direction of the upper extending portions 813, 813 of the wire 81, and also disposed at the center in the vehicle width direction of the lower extending portions 815, 815. When the upper bracket 21 makes a collapsing movement or moves forward, the R-shape portion 21c of the flange 21a comes into contact with the folding portions 814, 814 of the wire 81 and draws them at the same time with making plastic deformation. With this construction, it becomes possible to reduce twisting load on the upper bracket 21, so that stable impact absorption load can be generated.

Incidentally, the steering apparatus according to the present embodiment does not have such a construction that impact load is absorbed by fixing the guide pin 71 to the wire 81 with moving forward (with respect to the vehicle body) to make plastic deformation of the wire 81. Accordingly, there is no restriction in design such as the shape of the guide pin 71 has to be a one capable of coupling with the wire 81.

<First Variation of the Guide Bracket>

Figure 11:
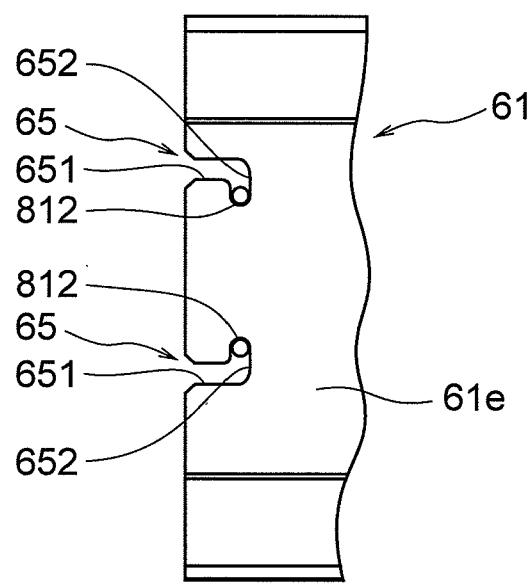
FIG. 11 is a plan view of a guide bracket alone according to a first variation, showing its rear portion with respect to the vehicle body.

Then, a first variation of the guide bracket according to the present embodiment is explained. FIG. 11 is a plan view of the guide bracket according to the first variation showing its rear portion alone with respect to the vehicle body. In the following explanations, only structural portions different from the guide bracket according to the above-described embodiment are explained, so that duplicated explanations are omitted.

Moreover, the explanations are carried out with attaching the same reference number to the same component. The first variation is a variation of the latching grooves 64, 64 of the guide bracket 61 according to the above-described embodiment.

As shown in FIG. 11, latching grooves 65, 65 disposed at the rear (with respect to the vehicle body) end of the guide bracket 61 are opened rearward with respect to the vehicle body and each composed of a linear groove portion 651 extending frontward (with respect to the vehicle body) in parallel to the center axis of the lower column 46 and a bent groove portion 652 formed with bending at right angle inward in the vehicle width direction at a front (with respect to the vehicle body) end of the linear groove portion 651.

As shown in FIG. 11, the vertical portions 812, 812 of the wire 81 are inserted into the latching grooves 65, 65 of the guide bracket 61, and latched to the bent groove portions 652, 652. Since the wire 81 is latched by the bent groove portions 652, 652, the wire 81 becomes difficult to be released from the latching grooves 65, 65 caused by impact during driving or upon collision. With using the wire 81 made of a wire rod having a circular section as an impact-energy-absorption member, the wire 81 can be moved smoothly from the linear groove portions 651, 651 to the bent groove portions 652, 652 of the latching grooves 64, 64, so that the wire 81 can be smoothly latched to the bent groove portions 652, 652.

<Second Variation of the Guide Bracket>

Figure 12:
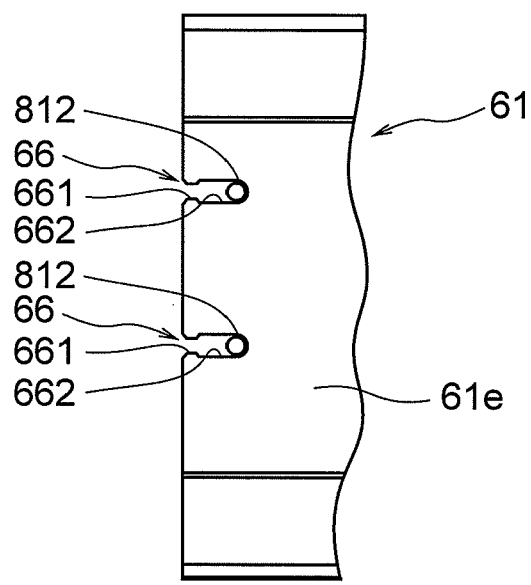
FIG. 12 is a plan view of a guide bracket alone according to a second variation, showing its rear portion with respect to the vehicle body.

Then, a second variation of the guide bracket according to the present embodiment is explained. FIG. 12 is a plan view of the guide bracket according to the second variation showing its rear portion alone with respect to the vehicle body. In the following explanations, only structural portions different from the guide bracket according to the above-described embodiment are explained, so that duplicated explanations are omitted. Moreover, the explanations are carried out with attaching the same reference number to the same component. The second variation is a variation of the latching grooves 64, 64 of the guide bracket 61 according to the above-described embodiment.

As shown in FIG. 12, each of latching grooves 66, 66 disposed at the rear (with respect to the vehicle body) end of the guide bracket 61, is opened rearward with respect to the vehicle body and has a narrow-width-linear-groove portion 661 having a little narrower width than a diameter of the wire 81, and extending frontward (with respect to the vehicle body) in parallel to the center axis of the lower column 46. Moreover, a wide-width-linear-groove portion 662 having a little wider width than the diameter of the wire 81, and extending frontward (with respect to the vehicle body) in parallel to the center axis of the lower column 46 is disposed frontward (with respect to the vehicle body) of the narrow-width-linear-groove portion 661.

As shown in FIG. 12, the vertical portions 812, 812 of the wire 81 are inserted into narrow-width-linear-groove portions 661, 661 of the guide bracket 61 with making elastic deformation of the narrow-width-linear-groove portions 661, 661 to be latched to the wide-width-linear-groove portions 662, 662. Since the wire 81 is caught by the narrow-width-linear-groove portions 661, 661, the wire 81 becomes difficult to be released from the latching grooves 66, 66 caused by impact during driving or upon collision. With using the wire 81 made of a wire rod having a circular section as an impact-energy-absorption member, the wire 81 can be moved smoothly from narrow-width-linear-groove portions 661, 661 to the wide-width-linear-groove portions 662, 662 of the latching grooves 66, 66, so that the wire 81 can be smoothly latched to the wide-width-linear-groove portions 662, 662.

While in the present embodiment, there have been described cases in which the present invention is applied to a tilt-telescopic type steering apparatus in which the tilt position and the telescopic position of the column are both adjusted, the present invention may be applied to a tilt type steering apparatus, a telescopic type steering apparatus, and a steering apparatus that allows adjustment of neither the tilt position nor telescopic position.

Figure 14:
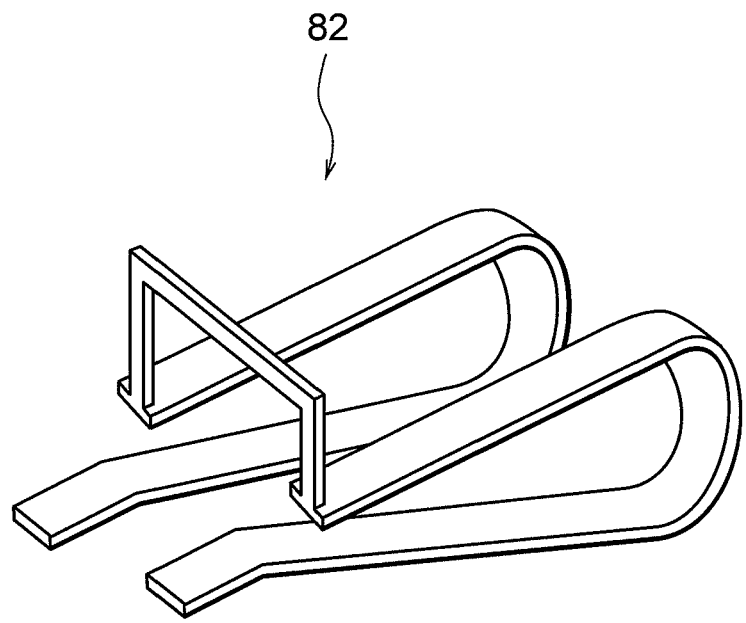
FIG. 14 is a perspective view showing a variation of the impact-energy-absorption member.

Although the steering apparatus according to the present embodiment is equipped with a metallic wire 81 as an impact-energy-absorption member as described above, the impact-energy-absorption member is not limited to this. For example, a plate 82 shown in FIG. 14 made by pressing a metallic board may be adopted as an impact-energy-absorption member.

What is claimed is:

1. A steering apparatus comprising:
    a lower column that can be fixed to a vehicle body by front side thereof with respect to the vehicle body;
    an upper column that is fitted to the lower column in such a way as to be able to move frontward with respect to the vehicle body and rotatably supports a steering shaft on which a steering wheel is attached;
    an upper bracket that can be attached to the vehicle body, and can move in such a way that it can be detached forward with respect to the vehicle body together with the upper column by an impact force upon a secondary collision; and
    an impact-energy-absorption member that absorbs impact energy by making plastic deformation with fitting to the upper bracket upon moving the upper bracket frontward with respect to the vehicle body;
    wherein the steering apparatus further camprises:
    a guide bracket that is fixed to the lower column by front side thereof with respect to the vehicle body, extends rearward with respect to the vehicle body along the lower column, and has a guide groove that guides the movement of the upper column upon a secondary collision; and
    a guide pin that is fixed to the upper bracket and can move with the upper bracket with the outer circumferential surface of its shaft portion being guided by the guide groove,
    the guide bracket having a gap setting portion that forms a gap extending front and rear direction with respect to the vehicle body between the guide bracket and the upper bracket, and the guide groove is formed on the gap setting portion, and
    the impact-energy-absorption member being latched to the guide bracket, and including an extending portion that extends in the gap between the gap setting portion of the guide bracket and the upper bracket.

2. The steering apparatus according to claim 1, wherein the extending portion of the impact-energy-absorption member includes a pair of first extending portions that extend frontward with respect to the vehicle body and a connecting portion that connects the pair of the first extending portions at rearward with respect to the vehicle body of the upper bracket, and
    the impact-energy-absorption member includes a pair of U-shape bending portions each connecting to the first extending portion at frontward with respect to the vehicle body of the upper bracket, and a pair of second extending portions that are disposed between the upper bracket and the upper column, and extend rearward with respect to the vehicle body with connecting the pair of U-shape bending portions, respectively.

3. The steering apparatus according to claim 2, wherein each rearward end with respect to the vehicle body of the first extending portion in the impact-energy-absorption member is latched to the guide bracket, and each of the U-shape bending portions is latched to the upper bracket upon moving the upper bracket frontward with respect to the vehicle body.

4. The steering apparatus according to claim 3, wherein the guide pin is only one and disposed between the first extending portions.

5. The steering apparatus according to claim 4, wherein a gap is provided between the frontward end with respect to the vehicle body of the upper bracket and each of the U-shape bending portions in the impact-energy-absorption member.

6. The steering apparatus according to claim 5, wherein a pair of latching grooves for latching rearward ends with respect to the vehicle body of the first extending portions of the impact-energy-absorption member are formed on the rearward end with respect to the vehicle body of the guide bracket.

7. The steering apparatus according to claim 1, wherein the impact-energy-absorption member is formed with bending a wire made of a metal.

8. The steering apparatus according to claim 6, wherein each of the latching grooves formed on the guide bracket has a linear groove portion extending frontward with respect to the vehicle body and a bent groove portion bending by right angle at the frontward end with respect to the vehicle body of the linear groove portion, and the bent groove portions are facing the same direction.

9. The steering apparatus according to claim 6, wherein each of the latching grooves formed on the guide bracket has a linear groove portion extending frontward with respect to the vehicle body and a bent groove portion bending by right angle at the frontward end with respect to the vehicle body of the linear groove portion, and the bent groove portions are facing with each other.

10. The steering apparatus according to claim 6, wherein each of the latching grooves formed on the guide bracket has a narrow-width-linear-groove portion that extends frontward with respect to the vehicle body and has a width narrower than the width of the first extending portion, and a wide-width-linear-groove portion that extends frontward with respect to the vehicle body of the narrow-width-linear-groove portion and has a width wider than the narrow-width-linear-groove portion.

11. The steering apparatus according to claim 2, wherein the impact-energy-absorption member is formed with bending a wire made of a metal.

12. The steering apparatus according to claim 3, wherein the impact-energy-absorption member is formed with bending a wire made of a metal.

13. The steering apparatus according to claim 4, wherein the impact-energy-absorption member is formed with bending a wire made of a metal.

14. The steering apparatus according to claim 5, wherein the impact-energy-absorption member is formed with bending a wire made of a metal.

15. The steering apparatus according to claim 6, wherein the impact-energy-absorption member is formed with bending a wire made of a metal.

* * * * *